Patented Mar. 14, 1944

2,344,467

UNITED STATES PATENT OFFICE 2,344,467

CATALYTIC ISOMERIZATION

Edward D. Reeves, Cranford, N. J., assignor to Standard Oil Development Company, a corporation of Delaware No Drawing. Application August 31, 1939,
Serial No. 292,779

14 Claims. (Cl. 260—683.5)

The present invention relates to isomerizing hydrocarbons and more specifically to converting normal or straight chain paraffins into iso- or branched chain paraffins by catalytic means.

It is known to isomerize or convert normal paraffinic hydrocarbons into branched chain paraffinic hydrocarbons by means of Friedel-Crafts type catalysts, such as aluminum chloride, aluminum bromide, zinc chloride, and the like. However, in such reactions the catalyst is not always maintained at a high degree of activity during the reaction.

It is an object of the present invention to provide a process for the catalytic isomerization of hydrocarbons, particularly paraffinic hydrocarbons, and to carry out such a process while maintaining the catalyst mass in a highly active condition. It is a further object of the invention to provide a continuous catalytic isomerization process wherein the actual catalytic agent is formed in situ and wherein such highly active form of catalyst is substantially maintained during the process. Another object is to isomerize straight run paraffinic naphthas of relatively low octane number and thereby form higher octane number naphthas of improved fuel qualities without substantial cracking. Still another object is to reduce catalyst degradation so that it is possible to materially enhance the catalyst life.

In order to accomplish these objects as well as others which will be apparent from a full understanding of the invention to be hereinafter more fully described, the conversion of straight chain hydrocarbons, particularly of the paraffin series, is effected in the presence of metals, particularly aluminum, although other metals such as iron and zinc may be employed, and in the presence of halogens such as chlorine and bromine, etc. This reaction may also be carried out in the presence of promoters, such as the hydrogen halides, for example, hydrogen chloride, hydrogen bromide, and the like. It is likewise efficacious for the ultimate conversion to high yields to employ small amounts of the lower alkyl halides, for example, methyl chloride or bromide, ethyl chloride or bromide, butyl and amyl halides, and the like. Instead of adding a free halogen to the metallic substance to form a Friedel-Crafts type of catalyst in situ, the process may be altered so that the promoter is directly added to the metallic component thereby producing the metal halide in situ and in addition permitting the evolution of free hydrogen in the process, said evolution proving beneficial in the isomerization reaction. If desired, mixtures of the promoters and free halogen may be added. Likewise, small amounts of catalyst suitable for expediting the formation of these Friedel-Crafts type catalysts may be employed, for example, mercury or mercury salts, such as mercuric chloride. By so producing the isomerization catalyst in situ, the amount contacted with the hydrocarbon can be carefully controlled, the spent catalyst may be readily nad semi-continuously removed, and highly active metal halide is always present for contacting with the feed.

The present process is capable of converting normal paraffins, such as normal butane, normal pentane, normal hexane, normal heptane and higher homologs, into their corresponding branched or iso forms, such as isobutane, isopentane, isohexane, isoheptane, and the like. The feed stock may also comprise mixtures of more than one of these straight chain paraffins, or, if convenient, the paraffinic hydrocarbon mixture may contain small proportions of branched chain paraffins, although for greatest efficiency the hydrocarbon feed stock should comprise essentially straight chain paraffins. Mixed paraffins, such as straight run naphthas, may also be converted into isomeric mixtures which have an increased value with respect to anti-detonation qualities and with respect to further chemical reactions to produce alkylation products when reacted with paraffins. In general, any hydrocarbon mixture composed predominately of saturated straight chain compounds is suitable as a feed stock for the process herein outlined. A product containing substantial amounts of branched chain isomers may be separated from the reaction medium and fractionated within the desired boiling range. The constituents boiling above and below the desired range may then be returned to the isomerization reactor to suppress their further formation or to be further isomerized to more useful products.

The isomerization may be effected over a wide range of conditions of temperature, time of contact, catalyst concentration, etc., all of these factors being interrelated. In general, temperatures between about 30° and about 400° F. may be employed, although at temperatures above 300° F. there is apt to be some decomposition and the formation of lower hydrocarbons and lower number of carbon atoms would be expected in such an instance. However, the presence of hydrogen formed in situ or added from extraneous sources has a tendency to suppress such decomposition reactions. The specific paraffins or specific temperature ranges are more desirable than others, for example, in the case of normal butane a temperature range between about 200° and 300° F. is found to be advantageous, while in the case of normal pentane and higher homologs a range from about 50° to about 150° F. is better. Good yields may be obtained within these ranges using a contact time of from about 10 seconds to about 20 hours, depending upon the temperature and the amount of catalyst employed.

The reaction is preferably carried out under liquid phase conditions. Hence any temperature below the critical temperature of the feed stock may be employed, although it is preferable to use the temperatures specified above. Sufficient superatmospheric pressure may be employed to maintain the reactants as well as the reaction products in the liquid phase under the reaction conditions obtained. In particular, liquid phase operations are conducive to the production of ultimate high yields and to the carrying out of the process in a continuous manner. It is to be understood, however, that the process is not only applicable to continuous operation, but it is contemplated to carry the same out in batch type apparatus for single batch operation. Where the reaction is carried out in the liquid phase, it has been found advantageous to intensively agitate the reaction mixture so that intimate contact is established between the feed and the catalyst. In the present case, the catalyst may be employed as a slurry and a mechanical agitator propelled by external means inserted in the reactor. On the other hand, where a bed type of catalyst is employed, it is well to employ liquid phase operation and to force the liquid hydrocarbon feed into the reactor under pressure through jets of restricted internal diameter or to employ turbo mixers or some similar dispersion means for increasing intimacy of contact between the catalyst and the feed.

The catalyst as heretofore indicated is produced in situ by the reaction of a suitable metal, such as aluminum, zinc, iron, or the like, with a halogen or a compound chemically reacting as the equivalent of free halogen under the conditions of reaction, such substances being for example, chlorine, bromine, hydrogen chloride, hydrogen bromide, alkyl halides heretofore mentioned, organic acid halides, such as acetyl bromide or chloride, or mixtures of these various compounds. Aluminum is preferable for use in the reaction. It may be employed in the form of foil, chips, flakes, grindings, powder, pellets, lumps, balls, or other highly porous form. The catalyst may be introduced directly into the reaction chamber where the Friedel-Crafts type catalyst is ultimately formed as a slurry within the reactor. The aluminum in its various forms may be filled into the reactor so that it is present as a stationary bed or a series of stationary beds through which the hydrocarbon flows, or aluminum may be added in small quantities to the feed stock and thereby carried into the reactor. At any event, it is advantageous to have present within the reactor small amounts of catalyst known to promote the formation of Friedel-Crafts type of reagents. Such metals are mercury, mercury salts, such as mercuric chloride, and the like. The presence of small amounts of water is also advantageous.

The isomerization reactor may be a bomb, autoclave, or some such suitable reactor. To this reactor is charged metallic aluminum and normal paraffin. The halogen-containing agent is then admitted, either from an extraneous source directly into the reactor, or it may be added to the feed in cases where the free metal is added directly to the reactor. The mixture is then vigorously agitated to bring about the reaction under suitable temperature conditions. As heretofore mentioned, small quantities of aluminum chloride may, if desired, be added directly to the fresh feed. The product in the continuous process is continuously withdrawn and filtered to remove the spent catalyst prior to either recycling the partially isomerized mixture or to fractionating out the desired isomeric product. When the catalyst which is filtered from the effluent from the reactor is not completely spent, it may likewise be returned to the isomerization reaction or, if desired, a preferable procedure involves the use of the partially spent catalyst in a secondary and separate isomerization reactor arranged in series with the original isomerization reactor.

The hydrocarbon may be present during the reaction in either the liquid or vapor phase, depending upon the particular temperature and pressure conditions employed. Both operations are feasible. However, it is preferred to use a liquid phase operation, the pressure being sufficient to maintain the hydrocarbons in liquid phase during the reaction.

No special type of apparatus is required for carrying out the process of the present invention. Any apparatus which is suitable for alkylation, polymerization, catalytic cracking, and the like may be employed. In general, it is preferred to preheat the hydrocarbon feed where heating is necessary for carrying out the reaction so that the feed enters the reactor at reaction temperature, although this is not necessary. It is likewise advisable to employ some device for separating the catalyst sludge from the reacted products prior to introducing these products into a separating means, for example, a distillation column, since the sludge tends to retard efficient heat transfer, and also in the case of a bubble tower tends to clog the plates thereby preventing efficient functioning of such towers. The apparatus may be constructed of the usual materials employed in constructing refinery apparatus. However, it is known that ferric oxide is somewhat deleterious to the isomerization process. Hence chemical apparatus prepared for operations involving high acid corrosion problems is particularly suitable for carrying out the present process. Glass-lined containers or containers made of or lined with stainless steel, ceramic substances, or other similar materials employed in connection with corrosive processes may be used. However, the invention is not limited to any particular type of apparatus, nor to any particular type of material employed in its construction.

In order to more fully understand the present invention the following examples are given:

*Example 1*

2% of aluminum powder was added to normal pentane and to this was then added 4% of amyl chloride and 2% of HCl. The mixture was held at about 75° F. and agitated for a period of 20 hours, whereupon the hydrocarbon constituents were withdrawn, distilled carefully so as to separate the isomerization product. It was then found that some 15% of the normal paraffin had reacted and the greater part of this was found to be isopentane. The amount of the lower boiling paraffins was quite small.

Example 2

In another experiment, about 10% of aluminum powder was added to normal pentane and about 5% of mercuric chloride was also added along with about 2% of HCl. The temperature was again held at about 75° F. and agitation was continued for a period of about 20 hours. About 6% of the normal paraffin was converted into isoparaffins with only a minor degree of decomposition.

Example 3

Normal butane was contacted in a closed vessel with about 4% by weight of HCl, an excess of metallic aluminum and a small amount of mercury which acts as a catalyst for the formation of aluminum chloride. At the end of 12 hours at a temperature of about 212° F., about 19% of the butane was isomerized to isobutane.

The present invention is not to be limited by any theory of the operation or any particular metal or halogen containing substance, but only to the following claims in which it is desired to claim all novelty inherent in the invention.

What is desired to be secured by Letters Patent is:

1. A process for isomerizing normal paraffin hydrocarbons comprising subjecting normal paraffin hydrocarbons containing at least 4 carbon atoms per molecule under isomerization reaction conditions to the action of powdered metal of the group consisting of aluminum, iron and zinc and a halogen-containing substance capable of reacting with the metal to form a metal halide, whereby a Friedel-Crafts catalyst is prepared in situ the reaction being carried out in the absence of extraneously produced metal halide.

2. A process which comprises continuously contacting a hydrocarbon mixture containing at least one normal paraffin containing at least four carbon atoms per molecule under sufficient superatmospheric pressure to maintain the reactants in liquid phase under the reaction conditions obtaining in the presence of a catalyst prepared in the reaction zone during the reaction by contacting comminuted metallic aluminum with a hydrogen halide while retaining the hydrogen developed in situ in the reaction system, under isomerization reaction conditions, and recovering branched chain paraffin from the reacted mixture the reaction being carried out in the absence of extraneously produced aluminum halide.

3. A process which comprises contacting at least one normal paraffin containing at least four carbon atoms per molecule in the liquid phase with a catalyst of finely divided particles of metallic aluminum the surface of which contains a coating of aluminum chloride formed in situ by contacting said particles with a chlorine-containing substance capable of reacting with the aluminum under the reaction conditions obtaining to give aluminum chloride, while maintaining isomerization reaction conditions the reaction being carried out in the absence of extraneously produced aluminum chloride.

4. A process as in claim 3 wherein the chlorine-containing substance is hydrogen chloride, said hydrogen chloride being present in sufficient amount to form aluminum chloride by reaction with the metallic aluminum and in sufficient amount to act as a promoter for the isomerization reaction as well.

5. A process for the production of isoparaffin which comprises isomerizing normal paraffin containing at least four carbon atoms per molecule under isomerization reaction conditions in the presence of a finely divided metal selected from the group consisting of aluminum, iron and zinc and a halogen-containing substance capable of reacting with the metal under the reaction conditions obtaining, thereby forming a Friedel-Crafts type metal halide catalyst in situ the reaction being carried out in the absence of extraneously produced metal halide.

6. A process as in claim 5 wherein the metal is aluminum and wherein the halogen-containing substance is hydrogen chloride, said hydrogen chloride being present in sufficient amounts to unite with the aluminum surface exposed thereto and to have sufficient excess thereover to serve as a promoter for the isomerization reaction.

7. A process as in claim 5 wherein the metal is aluminum and wherein a small amount of mercury is present in contact with the aluminum.

8. A process for the production of an isoparaffin which comprises isomerizing a normal paraffin containing at least four carbon atoms per molecule in liquid phase at a temperature between about 30° F. and about 400° F. under isomerization reaction conditions in the presence of finely divided metallic aluminum and a chlorine-containing substance capable of reacting with the aluminum under the isomerization reaction conditions, thereby forming aluminum chloride in situ the reaction being carried out in the absence of extraneously produced aluminum chloride.

9. A process as in claim 8 wherein normal butane is the normal paraffin employed and wherein the temperature is between about 70° F. and about 150° F.

10. A process as in claim 8 wherein normal pentane is the normal paraffin employed and wherein the temperature is between about 50° F. and about 150° F.

11. A process as in claim 8 wherein the reaction is carried out continuously and the chlorine-containing substance is added continuously and in small amounts yet in sufficient amounts to maintain some unreacted chlorine-containing substance present during the isomerization reaction.

12. A process as in claim 8 wherein the reaction is carried out continuously and the chlorine-containing substance is added to the normal paraffin feed stock.

13. A process as in claim 8 wherein the reaction is carried out continuously and hydrogen chloride is continuously added to the normal paraffin feed stock in small amounts, said amounts being sufficient to unite with the metallic aluminum coming in contact therewith and being sufficient to maintain a promotional amount of hydrogen chloride in unreacted state in the isomerization reaction.

14. A process as in claim 8 wherein chlorine is the chlorine-containing substance employed.

EDWARD D. REEVES.